United States Patent [19]

Ueda et al.

[11] Patent Number: 4,555,547
[45] Date of Patent: Nov. 26, 1985

[54] RUBBER COMPOSITION FOR TIRE TREADS

[75] Inventors: Akio Ueda, Yokohama; Shuichi Akita; Toshio Namizuka, both of Kamakura, all of Japan

[73] Assignee: Nippon Zeon Co. Ltd., Tokyo, Japan

[21] Appl. No.: 643,421

[22] Filed: Aug. 23, 1984

[51] Int. Cl.$^4$ .......................... C08L 7/00; C08L 9/00; C08L 9/06
[52] U.S. Cl. .................................. 525/237; 525/236; 525/194
[58] Field of Search ................ 525/237, 236, 212, 217

[56] References Cited

U.S. PATENT DOCUMENTS

| | | | |
|---|---|---|---|
| 4,224,197 | 9/1980 | Ueda et al. | 525/237 |
| 4,323,485 | 4/1982 | Ahagon et al. | 525/237 |
| 4,373,069 | 2/1983 | Bond et al. | 525/237 |
| 4,485,205 | 11/1984 | Fujimaki et al. | 525/237 |
| 4,510,291 | 4/1985 | Kawakami | 525/237 |
| 4,515,922 | 5/1985 | Sakibara et al. | 525/237 |

*Primary Examiner*—Allan M. Lieberman
*Attorney, Agent, or Firm*—Sherman & Shalloway

[57] ABSTRACT

A rubber composition for tire treads, comprising [I] 10 to 70% by weight of a polybutadiene rubber having bonded to a carbon atom of the rubber molecular chain at least 0.1 mole, per mole of the rubber molecular chain, of an atomic grouping represented by the following formula

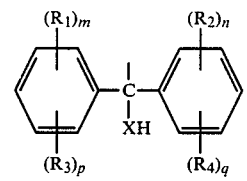

wherein X represents O or S, $R_1$ and $R_2$ are identical or different and each represents an amino group or an alkyl-substituted amino group, $R_3$ and $R_4$ are identical or different and each represents a substituent other than the above-mentioned, m, p and q each represent 0 or an integer of at least 1, n represents an integer of at least 1, $m+p=0-5$, and $n+q=1-5$, and [II] 90 to 30% by weight of at least one rubber selected from the group consisting of styrene-butadiene copolymer rubber having a bound stryene content of not more than 50% by weight and polyisoprene rubber.

8 Claims, No Drawings

RUBBER COMPOSITION FOR TIRE TREADS

This invention relates to a rubber composition for tire treads, which has an improved rebound.

It has recently been strongly desired to reduce the rolling resistance of tires and increase its excellent braking property on a wet road surface, i.e. its wet skid resistance, in order to reduce the fuel cost of automobiles and secure their safety.

Generally, these properties of tires are considered in relation to the dynamic viscoelastic properties of the tread rubber material, and are known to be contradictory properties [see, for example, Transaction of I.R.I., Vol. 40, pages 239–256, 1964].

Reduction of the rolling resistance of tires requires that the tread rubber materials should have a high rebound. In view of the driving condition of an automobile, the rebound should be evaluated at a temperature between about 50° C. and about 70° C. On the other hand, to improve the braking properties of tires on a wet road surface which are important for safety, the tires should have a high wet skid resistance measured by a British portable skid tester. The tread rubber materials should have large energy losses as frictional resistance which occurs when a tire is allowed to slide over a road surface while applying brake thereto.

Heretofore, to satisfy these two contradictory properties, emulsion-polymerized styrene/butadiene copolymer rubber, high cis-polybutadiene rubber, low cis-polybutadiene rubber, styrene/butadiene rubber obtained by using an organolithium compound catalyst, natural rubber and high cis-isoprene rubber have been used as raw materials either singly or in combination. But these rubbers have not proved to be entirely satisfactory. Specifically, when it is desired to obtain a high rebound, it was necessary to increase the proportion of a rubber having poor wet skid resistance such as low cis-polybutadiene rubber or natural rubber, decrease the amount of a filler such as carbon black, or to increase the amount of a vulcanizing agent such as sulfur. Such a method, however, has the defect that the resulting tire has reduced wet skid resistance or reduced mechanical properties. On the other hand, when it is desired to obtain high wet skid resistance it is necessary to increase the proportion of a rubber having excellent wet skid resistance such as a styrene/butadiene copolymer rubber having a relatively high bound styrene content (for example a bound styrene content of at least 30% by weight) or polybutadiene rubber having a relatively high 1,2-linkage content (for example, a 1,2-linkage content of at least 60%), or increase the amount of a filler such as carbon black or a process oil. This method, however, has the defect of reducing rebounds.

The current practice is to determine the kinds and proportions of starting rubbers so that they maintain practical mechanical properties and harmonize wet skid resistance and rebound within a practically permissible range. It has been thought therefore that the technique of maintaining wet skid resistance and rebound in harmony by combining conventional rubbers has reached its limit.

The present inventors have made extensive investigations in order to eliminate the aforesaid defects, and found surprisingly that a rubber composition comprising as a rubber component a polybutadiene rubber having bonded to a carbon atom of its molecular chain an atomic grouping represented by the general formula

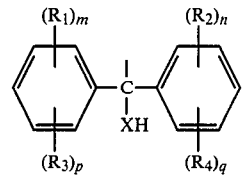

wherein X represents O or S, $R_1$ and $R_2$ are identical or different and each represents an amino group or an alkyl-substituted amino group, $R_3$ and $R^4$ are identical or different and each represents a substituent other than the above-mentioned, for example, a hydrocarbon group, an alkoxy group or a halogen atom, m, p and q represents 0 or an integer of at least 1, n represents an integer of at least 1, $m+p=0-5$, and $n+p=1-5$, can be greatly improved in rebound without a reduction in wet skid resistance over a rubber composition containing the same polybutadiene rubber which does not contain the aforesaid atomic grouping bonded thereto, and that if necessary while improving the mechanical properties such as abrasion resistance by increasing the amount of a filler such as carbon black, the rebound and the wet skid resistance can be harmonized.

According to this invention there is provided a rubber composition for tire treads whose rolling resistance has been reduced without deteriorating their mechanical properties and wet skid resitance, said composition comprising [I] 10 to 70% by weight, preferably 20 to 60% by weight, of a polybutadiene rubber having an atomic grouping represented by the above general formula bonded to a carbon atom of the rubber molecular chain, and [II] 90 to 30% by weight, preferably 80 to 40% by weight, of at least one rubber selected from the group consisting of a styrene/butadiene copolymer rubber having a bound styrene content of not more than 50% by weight and a polyisoprene rubber.

The polybutadiene rubber [I] used in this invention is an essentially amorphous polybutadiene rubber having a 1,2-linkage content of 40 to 90% and containing at least 0.1 mole of the aforesaid atomic grouping bonded per mole of the rubber molecular chain.

The styrene/butadiene copolymer rubber [II] is produced by emulsion polymerization or solution polymerization, and has a bound styrene content of 3 to 50% by weight and a 1,2-linkage content of butadiene units of 10 to 90%.

The polyisoprene rubber [II] is natural rubber or a synthetic polyisoprene rubber having a cis-1,4-linkage content of at least 90%.

In the rubber composition of this invention, at least one rubber [II] of the styrene-butadiene copolymer rubber and polyisoprene rubber is mixed with the polybutadiene rubber [I]. The proportion of the polybutadiene rubber [I] is 10 to 70% by weight, and the proportion of the rubber [II] is 90 to 30% by weight. If the proportion of the polybutadiene rubber [I] is less than 10% by weight (namely, when the amount of the rubber [II] exceeds 90% by weight), the rebound of the vulcanizate is not enhanced. If the proportion of the polybutadiene rubber [I] exceeds 70% by weight (namely, when the proportion of the rubber [II] is less than 30% by weight), the tensile strength and abrasion resistance of the vulcanizate ae reduced.

Rubbers other than the polybutadiene rubber [I] and the rubber [II] can be incorporated in the composition of this invention. From the viewpoint of the abrasion resistance of the vulcanizate, the use of a polybutadiene rubber [III] having a high cis-1,4-linkage content is especially preferred. In this case, the proportion of the rubber [III] is 5 to 50 parts by weight per 100 parts of the polybutadiene rubber [I] and the rubber [II] combined. If the proportion of the rubber [III] exceeds the upper limit specified, the abrasion resistance of the vulcanizate is further improved but its wet skid resistance is undesirably reduced.

From the tire tread rubber composition of this invention there can be obtained a tire having rolling resistance and wet skid resistance, i.e. braking property on a wet road surface, which are well harmonized in a high level. The composition of this invention can also be used to produce tires which require high rebounds but do not particularly require wet skid resistance.

The polybutadiene rubber having the aforesaid atomic grouping bonded to a carbon atom of the rubber molecular chain (to be referred to as the modified BR) can be obtained, for example, by reacting a metal-terminated polybutadiene rubber produced by polymerizing 1,3-butadiene in the presence of an ordinary alkali metal or alkaline earth metal catalyst, or a polybutadiene rubber having a metal randomly added to its molecular chain by an after-reaction, with benzophenones or thiobenzophenones to be described hereinafter.

Examples of the benzophenones used in the aforesaid reaction are 4-aminobenzophenone, 4-dimethylaminobenzophenone, 4-dimethylamino-4'-methylbenzophenone, 4,4'-diaminobenzophenone, 4,4'-bis(dimethylamino)benzophenone, 4,4'-bis(diethylamino)benzophenone, 4,4'-bis(ethylamino)benzophenone, 3,3'-dimethyl-4,4'-bis(diethylamino)benzophenone, 3,3'-dimethoxy-4,4'-bis(dimethylamino)benzophenone, 3,3',5,5'-tetraaminobenzophenone, 2,4,6-triaminobenzophenone and 3,3',5,5'-tetra(diethylamino)benzophenone. Preferred are 4-alkyl-substituted aminobenzophenones and 4,4'-bis(alkyl-substituted amino)benzophenones.

The thiobenzophenones may be those corresponding to the above-exemplified benzophenones.

By the above reaction, the benzophenone or thiobenzophenone is bonded to the terminals of the molecular chain, or both the terminals and other parts of the molecular chain, through a carbon-carbon bond as an atomic grouping represented by the following general formula

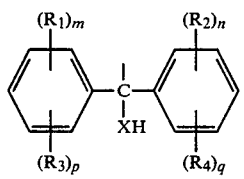

wherein X represents O or S, $R_1$ and $R_2$ are identical or different and each represents an amino group or an alkyl-substituted amino group such as an alkylamino or dialkylamino group with the alkyl moiety having about 1 to 10 carbon atoms, $R_3$ and $R_4$ are identical or different and each represents a substituent different from $R_1$ and $R_2$, for example a hydrocarbon group such as an alkyl, alkenyl or cycloalkyl group, an alkoxy group or a halogen atom, m, p and q each represent 0 or an integer of at least 1, n represents an integer of at least 1, $m+p=0-5$, preferably 0–3, and $n+q=1-5$, preferably 1–3.

The modified BR used in this invention can be produced, for example, by a method which comprises polymerizing butadiene in the presence of a metal-base catalyst and prior to short-stopping the polymerization adding the (thio)benzophenone to the living rubber solution resulting from the polymerization, or a method which comprises adding a metal to a polybutadiene rubber in a solution by addition reaction and thereafter adding the (thio)benzophenone.

The metal-base catalyst used in the polymerization or the addition-reaction includes the monofunctional or multifunctional organometal initiators or the metals themselves wherein the metal is selected from Groups IA and IIA of the periodic table as shown in Kirk-Othmer Encyclopedia of Chemical Technology, Interscience Publishers, Second Edition (1965), Vol. 8, page 94.

The amount of the (thio)benzophenone to be introduced into the polybutadiene rubber as the bonded atomic grouping is at least 0.1 mole on an average per mole of the rubber molecular chain. If it is less than 0.1 mole, no improvement in rebound can be obtained. It is preferably at least 0.3 mole, more preferably at least 0.5 mole, especially preferably at least 0.7 mole. If it exceeds 5 moles, the rubbery elasticity will be undesirably lost.

All or some of the rubber components used in the present invention may be oil-extended rubbers.

Tires can be produced by kneading the rubber composition of this invention with various general compounding chemicals used in the rubber industry, such as sulfur, stearic acid, zinc oxide, various vulcanization accelerators (thiazoles, thiurams and sulfenamides), carbon black of various grades such as HAF and ISAF, reinforcing agents such as silica and calcium carbonate, and process oils, selected depending upon the types of the tires, by means of a mixer such as a roll or a Banbury mixer, molding the rubber compound and vulcanizing it.

Since the rubber composition of this invention has rebound and wet skid resistance harmonized at a high level, it is suitable as a material for automobile tires having improved safety and fuel consumption. It can also be used for producing bicycle tires.

The following examples illustrate the present invention specifically.

PRODUCTION EXAMPLE (1) A 2-liter stainless steel polymerization reactor was washed, dried and purged with dry nitrogen, and then charged with 150 g of 1,3-butadiene, 20 g of benzene, 0.25 or 0.35 millimole of diethylene glycol dimethyl ether (diglyme) and 1.3 millimoles of n-butyllithium (as an n-hexane solution). The polymerization was carried out at 40° C. for 1 hour while stirring the contents. Prior to short-stopping the polymerization, 4,4'-bis(diethylamino)benzophenone was added in an amount 1.5 molar times its catalytic amount. The mixture was stirred for 5 minutes, and the polymer solution in the polymerization reactor was taken into a 1.5% methanol solution of 2,6-di-t-butyl-p-cresol (BHT) to coagulate the resulting polymer. The polymer was dried under reduced pressure at 60° C. for 24 hours, and its Mooney viscosity was measured [BR (2), BR (4)].

Polybutadiene rubbers were also prepared in the above manner except that a thiobenzophenone corresponding to the above benzophenone was used [BR (2'), BR (4')].

After the polymerization, the polymer solution was taken into a methanol solution containing BHT without adding 4,4'-bis(diethylamino)(thio)benzophenone to coagulate the resulting polymer. Then, in the same way as above, dried polymers were contained [BR (1), BR (3)].

(2) 1,3-Butadiene was polymerzed under the same conditions as described in (1) above except that 0.25 millimole of diglyme was used. After the polymerization, the polymer solution in the polymerization reactor was poured into a methanol solution containing BHT to coagulate the resulting polybutadiene. The separated crumb was dissolved in benzene, and the polybutadiene was coagulated by the same operation as above. This operation was repeated three times to remove the catalyst residue from the polybutadiene. The polymer was dried under the same conditions as in (1) above, and purified to obtain a dry polybutadiene.

One hundred grams of the polybutadiene was dissolved in 1000 g of dry benzene, and 3.5 millimoles of n-butyllithium and 3.5 millimoles of tetramethyl ethylenediamine were added. The reaction was carried out at 70° C. for 1 hour.

Then, 2.7 millimoles of 4,4'-bis(diethylamino)benzophenone was added, and reacted for 5 minutes. The polymer was coagulated and dried in the same way as above [BR (5)].

(3) A 2-liter stainless steel polymerization reactor was treated in the same way as above, and charged with 60 g of styrene, 140 g of 1,3-butadiene, 600 g of n-hexane, 0.24 millimole of diethylene glycol dimethyl ether (diglyme) and 1.2 millimoles of n-butyllithium. The polymerization was carried out at 60° C. for 1 hour. After the polymerization, the polymer solution was taken into a methanol solution containing BHT to coagulate the resulting polymer, and a dry polymer was obtained in the same way as above [SBR (1)].

The microstructures and Mooney viscosities of the rubbers prepared by the above methods and the amount of 4,4'-bis(diethylamino)benzophenone introduced into the rubbers are summarized in Table 1.

The microstructure was measured by an ordinary infrared spectroscopic method. The amount of the bonded 4,4'-bis(diethylamino)benzophenone bonded was measured by using $^{13}$C-NMR. Table 1 gives data for a styrene/butadiene copolymer rubber [E-SBR] prepared by ordinary emulsion polymerization.

TABLE 1

| Rubber | Amount of bound styrene (wt. %) | 1,2-linkage content (mole %) | Mooney viscosity (ML$_{1+4}$, 100° C.) | Amount of the (thio)benzophenone bonded (moles per mole of the molecular chain) |
|---|---|---|---|---|
| BR(1) | — | 44 | 72 | 0 |
| BR(2) | — | 44 | 72 | 0.6 |
| BR(2') | — | 44 | 72 | 0.6 |
| BR(3) | — | 65 | 46 | 0 |
| BR(4) | — | 65 | 46 | 0.8 |
| BR(4') | — | 65 | 46 | 0.8 |
| BR(5) | — | 44 | 76 | 1.3 |
| SBR | 25 | 19 | 53 | 0 |
| E-SBR | 45 | 20 | 65 | 0 |

EXAMPLE 1

The various compounding chemicals shown in Table 2 and each of the starting rubber components shown in Table 3 were kneaded in a 250 ml Brabender-type mixer to form a rubber composition. Sulfur and the vulcanization accelerator were used in amounts which would give an optimal vulcanizate of the rubber composition. The rubber composition was press-cured at 160° C. for 15 to 30 minutes, and test samples were prepared.

TABLE 2

| Compounding recipe | |
|---|---|
| Starting rubber (see Tables 3 and 4) | 100 parts by weight |
| HAF carbon Black | 50 parts by weight |
| Aromatic process oil | 5 parts by weight |
| ZnO No. 3 | 3 parts by weight |
| Stearic acid | 2 parts by weight |
| Sulfur | Variable amounts (see Table 3) |
| Vulcanization accelerator (N—cyclohexyl-2-benzothiazyl sulfenamide) | |

The properties of the vulcanizates of these rubber compositions were measured, and the results are shown in Table 3.

The strength properties were measured in accordance with JIS K-6301. The rebound was measured at a temperature of 55° C. by using a Dunlop tripsometer. The wet skid resistance was measured by a portable skid tester (made by Stanley Company, U.S.A.) at 23° C. on a road surface in accordance with ASTM E-303-74 (made by 3M; type B for outdoor use, a black safety walk), and expressed by an index calculated from the following formula.

$$\frac{\text{Wet skid resistance value of the vulcanizate}}{\text{Wet skid resistance value of the vulcanizate of E-SBR-1502}} \times 100$$

The Pico abrasion was measured by a Goodrich-type Pico abrasion tester in accordance with ASTM D-2228, and expressed by an index calculated from the following formula.

$$\frac{\text{Amount of abrasion of the vulcanizate of E-SBR-1502}}{\text{Amount of abrasion of the vulcanizate of the rubber composition}} \times 100$$

The results are shown in Table 3.

TABLE 3

| | Run No. | |
|---|---|---|
| | Comparison | Invention |

TABLE 3-continued

|  |  | 1 | 2 | 3 | 4 | 5 | 6 | 7 | 8 | 9 |
|---|---|---|---|---|---|---|---|---|---|---|
| Rubber components | SBR-1502 (*) | 100 |  |  |  |  |  |  |  |  |
|  | BR(1) |  | 30 | 50 |  |  |  |  |  |  |
|  | BR(2) |  |  |  | 30 | 30 | 50 | 40 |  |  |
|  | BR(2') |  |  |  |  |  |  |  | 50 | 40 |
|  | E-SBR |  | 70 | 50 | 70 | 55 | 50 | 50 | 50 | 50 |
|  | cis BR (**) |  |  |  |  | 15 |  | 10 |  | 10 |
| Sulfur |  | 1.8 | 1.56 | 1.4 | 1.56 | 1.56 | 1.4 | 1.4 | 1.4 | 1.4 |
| Vulcanization accelerator |  | 1.2 | 1.44 | 1.6 | 1.44 | 1.44 | 1.6 | 1.6 | 1.6 | 1.6 |
| Rebound (%) |  | 55 | 59 | 62 | 63 | 65 | 66 | 65 | 65 | 64 |
| Wet skid resistance index |  | 100 | 108 | 102 | 108 | 100 | 102 | 100 | 102 | 100 |
| Abrasion resistance index |  | 100 | 80 | 84 | 81 | 117 | 89 | 98 | 88 | 98 |
| Tensile strength (kg/cm$^2$) |  | 278 | 240 | 224 | 240 | 225 | 222 | 220 | 217 | 215 |
| Elongation (%) |  | 490 | 450 | 470 | 440 | 430 | 450 | 440 | 460 | 450 |
| 300% Tensile strength (kg/cm$^2$) |  | 140 | 126 | 116 | 128 | 115 | 119 | 120 | 117 | 115 |

| |  | Comparison | | | Invention | | | | | | | | |
|---|---|---|---|---|---|---|---|---|---|---|---|---|---|
| | Run No. | 10 | 11 | 12 | 13 | 14 | 15 | 16 | 17 | 18 | 19 | 20 | 21 |
| Rubber components | BR(3) | 70 | 50 | 70 |  |  |  |  |  |  |  |  |  |
|  | BR(4) |  |  |  | 70 | 60 | 50 | 50 | 70 |  |  |  |  |
|  | BR(4') |  |  |  |  |  |  |  |  | 50 | 50 |  |  |
|  | BR(5) |  |  |  |  |  |  |  |  |  |  | 50 | 50 |
|  | SBR(1) | 30 | 50 |  | 30 | 30 | 50 | 40 |  | 50 | 40 |  |  |
|  | E-SBR |  |  | 20 |  |  |  |  | 20 |  |  | 50 | 40 |
|  | cis BR |  |  | 10 |  | 10 |  | 10 | 10 |  | 10 |  | 10 |
| Sulfur |  | 1.24 | 1.4 | 1.21 | 1.24 | 1.24 | 1.4 | 1.4 | 1.21 | 1.4 | 1.4 | 1.4 | 1.4 |
| Vulcanization accelerator |  | 1.76 | 1.6 | 1.75 | 1.76 | 1.76 | 1.6 | 1.6 | 1.75 | 1.6 | 1.6 | 1.6 | 1.6 |
| Rebound (%) |  | 62 | 63 | 59 | 68 | 65 | 68 | 68 | 66 | 68 | 68 | 69 | 70 |
| Wet skid resistance index |  | 102 | 101 | 101 | 102 | 100 | 101 | 98 | 101 | 101 | 98 | 105 | 101 |
| Abrasion resistance index |  | 95 | 95 | 100 | 98 | 105 | 95 | 105 | 100 | 95 | 105 | 89 | 98 |
| Tensile strength (kg/cm$^2$) |  | 207 | 217 | 203 | 196 | 198 | 216 | 205 | 192 | 220 | 205 | 215 | 200 |
| Elongation (%) |  | 450 | 500 | 440 | 420 | 430 | 480 | 465 | 410 | 480 | 465 | 450 | 440 |
| 300% Tensile strength (kg/cm$^2$) |  | 114 | 109 | 112 | 118 | 115 | 112 | 120 | 117 | 114 | 118 | 120 | 115 |

(*): SBR-1502: Nipol SBR-1502 produced by Nippon Zeon Co., Ltd.
(**): cis BR: Nipol BR-1220 produced by Nippon Zeon Co., Ltd.

It is seen from the results shown in Table 3 that the rebounds in Runs Nos. 4 to 9, 13 to 21 of the invention are improved by 3 to 4 points over comparative runs 2 to 3, 10 to 12 without deteriorating wet skid resistance or Pico abrasion.

EXAMPLE 2

In each run, a rubber composition was prepared in accordance with the same compounding recipe as in Example 1 using each of the polymers BR (1) to BR (5) used in Example 1 and each of the three SBR polymers indicated in Table 4. The composition was press-cured at 160° C. for 15 to 30 minutes to prepare test samples. The samples were subjected to the same tests as in Example 1. The results are shown in Table 5.

TABLE 4

| Kind of rubber | Bound styrene content (wt. %) | 1,2-linkage unit content (mole %) | Mooney viscosity (ML$_{1+4}$, 100° C.) |
|---|---|---|---|
| SBR(2) | 6 | 71 | 55 |
| SBR(3) | 24 | 42 | 60 |
| SBR(4) | 25 | 70 | 61 |

TABLE 5

| | | Comparison | | | | Invention | | | | | | |
|---|---|---|---|---|---|---|---|---|---|---|---|---|
| | Run No. | 1 | 2 | 3 | 4 | 5 | 6 | 7 | 8 | 9 | 10 | 11 |
| Rubber components | SBR-1502 | 100 |  |  |  |  |  |  |  |  |  |  |
|  | BR(1) |  | 50 | 50 | 30 |  |  |  |  |  |  |  |
|  | BR(2) |  |  |  |  | 50 | 50 | 50 | 50 | 30 |  |  |
|  | BR(2') |  |  |  |  |  |  |  |  |  | 50 | 50 |
|  | SBR(2) |  | 50 |  | 60 | 50 | 40 |  |  |  | 50 | 40 |
|  | SBR(3) |  |  |  |  |  |  |  |  |  |  |  |
|  | SBR(4) |  |  | 50 |  |  |  | 50 | 35 |  |  |  |
|  | cis BR |  |  |  | 10 |  | 10 |  | 15 | 10 |  | 10 |
| Sulfur |  | 1.8 | 1.4 | 1.4 | 1.63 | 1.4 | 1.4 | 1.4 | 1.4 | 1.63 | 1.4 | 1.4 |
| Vulcanization accelerator |  | 1.2 | 1.6 | 1.6 | 1.45 | 1.6 | 1.6 | 1.6 | 1.6 | 1.43 | 1.6 | 1.6 |
| Rebound (%) |  | 55 | 64 | 59 | 61 | 67 | 68 | 63 | 66 | 64 | 63 | 63 |
| Wet skid resistance index |  | 100 | 102 | 109 | 102 | 102 | 98 | 109 | 100 | 102 | 109 | 102 |
| Pico abrasion index |  | 100 | 89 | 80 | 97 | 91 | 105 | 79 | 98 | 100 | 80 | 98 |
| Tensile strength (kg/cm$^2$) |  | 278 | 193 | 209 | 195 | 195 | 190 | 218 | 195 | 199 | 215 | 205 |
| Elongation (%) |  | 490 | 460 | 470 | 450 | 450 | 440 | 450 | 440 | 440 | 450 | 440 |
| 300% Tensile strength (kg/cm$^2$) |  | 140 | 109 | 114 | 110 | 111 | 115 | 120 | 118 | 113 | 118 | 115 |

| Run No. | | |
|---|---|---|
| Comparison | Invention | |

TABLE 5-continued

|  |  | 12 | 13 | 14 | 15 | 16 | 17 | 18 | 19 | 20 | 21 | 22 | 23 |
|---|---|---|---|---|---|---|---|---|---|---|---|---|---|
| Rubber components | BR(3) | 50 | 50 | 50 | 40 |  |  |  |  |  |  |  |  |
|  | BR(4) |  |  |  |  | 50 | 50 | 50 | 40 |  |  |  |  |
|  | BR(4') |  |  |  |  |  |  |  |  | 50 | 50 |  |  |
|  | BR(5) |  |  |  |  |  |  |  |  |  |  | 50 | 50 |
|  | SBR(2) | 50 |  |  |  | 50 |  |  |  |  |  | 50 | 40 |
|  | SBR(3) |  | 50 |  |  |  | 50 |  |  |  |  |  |  |
|  | SBR(4) |  |  | 50 | 40 |  |  | 50 | 40 | 50 | 35 |  |  |
|  | cis BR |  |  |  | 20 |  |  |  | 20 |  | 15 |  | 10 |
| Sulfur |  | 1.4 | 1.4 | 1.4 | 1.42 | 1.4 | 1.4 | 1.4 | 1.42 | 1.4 | 1.4 | 1.4 | 1.4 |
| Vulcanization accelerator |  | 1.6 | 1.6 | 1.6 | 1.5 | 1.6 | 1.6 | 1.6 | 1.5 | 1.6 | 1.6 | 1.6 | 1.6 |
| Rebound (%) |  | 59 | 60 | 55 | 56 | 64 | 65 | 62 | 63 | 65 | 68 | 67 | 67 |
| Wet skid resistance |  | 106 | 106 | 112 | 104 | 106 | 106 | 112 | 104 | 106 | 98 | 102 | 95 |
| Pico abrasion index |  | 77 | 82 | 69 | 104 | 81 | 83 | 72 | 102 | 82 | 105 | 88 | 105 |
| Tensile strength (kg/cm$^2$) |  | 195 | 213 | 211 | 204 | 195 | 205 | 211 | 206 | 210 | 195 | 190 | 185 |
| Elongation (%) |  | 420 | 460 | 430 | 450 | 400 | 440 | 400 | 430 | 440 | 430 | 440 | 430 |
| 300% Tensile strength (kg/cm$^2$) |  | 116 | 120 | 124 | 113 | 119 | 123 | 130 | 118 | 125 | 120 | 117 | 115 |

EXAMPLE 3

Each of the seven BR rubbers, polyisoprene rubber (cis IR; Nipol IR 2200 made by Nippon Zeon Co., Ltd.; cis 1,4-linkage content more than 97 mole%) and cis BR was compounded in the proportions indicated in Table 7. The composition was vulcanized and tested in the same way as in Example 1. The results are summarized in Table 7.

TABLE 6

| Rubber | 1,2-linkage unit content (mole %) | Mooney viscosity (ML$_{1+4}$, 100° C.) | Amount of the (thio)benzophenone (*) bonded (moles per mole of the molecular chain) |
|---|---|---|---|
| BR(6) | 66 | 46 | 0 |
| BR(7) | 66 | 46 | 0.8 |
| BR(7') | 66 | 46 | 0.8(**) |
| BR(8) | 84 | 56 | 0 |
| BR(9) | 84 | 56 | 0.8 |
| BR(9') | 84 | 56 | 0.8(**) |
| BR(10) | 66 | 50 | 1.3(***) |

(*): 3,3'-dimethyl—4,4'-bis(dimethylamino)-benzophenone
(**): the thiobenzophenone corresponding to (*).
(***): Bonded randomly to the molecular chain; otherwise, bonded to the chain end.

TABLE 7

|  |  | Run No. Comparison ||||||||
|---|---|---|---|---|---|---|---|---|---|
|  |  | 1 | 2 | 3 | 4 | 5 | 6 | 7 | 8 |
| Rubber components | SBR-1502 | 100 |  |  |  |  |  |  |  |
|  | BR(6) |  | 70 | 70 |  |  |  |  |  |
|  | BR(8) |  |  |  | 70 | 50 | 50 | 50 | 50 |
|  | cis IR (*) |  | 30 | 20 | 30 | 50 | 30 | 50 | 50 |
|  | cis BR |  |  | 10 |  |  | 20 |  |  |
| HAF carbon black |  | 50 | 50 | 50 | 50 | 50 | 50 | 50 | 55 |
| Sulfur |  | 1.8 | 1.3 | 1.25 | 1.3 | 1.5 | 1.4 | 1.5 | 1.5 |
| Vulcanization accelerator |  | 1.2 | 1.64 | 1.67 | 1.64 | 1.4 | 1.46 | 1.4 | 1.4 |
| Rebound (%) |  | 55 | 61 | 60 | 57 | 58 | 57 | 58 | 54 |
| Wet skid resistance index |  | 100 | 101 | 100 | 107 | 104 | 100 | 104 | 105 |
| Abrasion resistance index |  | 100 | 88 | 103 | 72 | 75 | 106 | 75 | 90 |
| Tensile strength (kg/cm$^2$) |  | 278 | 215 | 205 | 211 | 230 | 213 | 230 | 232 |
| Elongation (%) |  | 490 | 460 | 460 | 440 | 470 | 460 | 470 | 450 |
| 300% Tensile strength (kg/cm$^2$) |  | 140 | 115 | 110 | 126 | 125 | 117 | 125 | 146 |

|  |  | Run No. Invention |||||||||||||
|---|---|---|---|---|---|---|---|---|---|---|---|---|---|---|
|  |  | 9 | 10 | 11 | 12 | 13 | 14 | 15 | 16 | 17 | 18 | 19 | 20 | 21 |
| Rubber components | BR(7) | 70 | 70 |  |  |  |  |  |  |  |  |  |  |  |
|  | BR(7') |  |  |  |  |  |  | 70 |  |  |  |  |  |  |
|  | BR(9) |  |  | 70 | 60 | 50 | 50 |  |  |  |  |  | 50 | 50 |
|  | BR(9') |  |  |  |  |  |  |  | 70 | 60 |  |  |  |  |
|  | BR(10) |  |  |  |  |  |  |  |  |  | 70 | 60 |  |  |
|  | cis IR | 30 | 20 | 30 | 30 | 50 | 30 | 30 | 30 | 30 | 30 | 30 | 50 | 30 |
|  | cis BR |  | 10 |  | 10 |  | 20 |  |  | 10 |  | 10 |  | 20 |
| HAF carbon black |  | 50 | 50 | 50 | 50 | 50 | 50 | 50 | 50 | 50 | 50 | 50 | 55 | 55 |
| Sulfur |  | 1.3 | 1.25 | 1.3 | 1.3 | 1.5 | 1.4 | 1.3 | 1.3 | 1.3 | 1.3 | 1.3 | 1.5 | 1.5 |
| Vulcanization accelerator |  | 1.64 | 1.67 | 1.64 | 1.64 | 1.5 | 1.46 | 1.64 | 1.64 | 1.64 | 1.64 | 1.64 | 1.4 | 1.4 |
| Rebound (%) |  | 68 | 67 | 63 | 62 | 63 | 62 | 68 | 63 | 62 | 69 | 68 | 60 | 58 |
| Wet skid resistance index |  | 101 | 100 | 107 | 100 | 104 | 100 | 100 | 107 | 100 | 101 | 98 | 105 | 100 |
| Abrasion resistance index |  | 89 | 102 | 70 | 101 | 75 | 108 | 90 | 71 | 104 | 89 | 102 | 91 | 104 |
| Tensile strength (kg/cm$^2$) |  | 209 | 200 | 212 | 195 | 232 | 210 | 210 | 215 | 200 | 208 | 200 | 238 | 220 |
| Elongation (%) |  | 440 | 440 | 420 | 400 | 450 | 440 | 440 | 420 | 410 | 450 | 430 | 420 | 910 |
| 300% Tensile strength (kg/cm$^2$) |  | 120 | 114 | 131 | 122 | 130 | 121 | 118 | 129 | 123 | 120 | 110 | 155 | 144 |

(*): Nipol IR 2200 (cis-1,4-linkage content more than 97%)

EXAMPLE 4

Each of the BR and SBR rubbers, SBR (1) used in Example 1, natural rubber (NR) and cis BR was compounded in the proportions shown in Table 9. The composition was vulcanized and tested in the same way as in Example 1. The results are shown in Table 9.

TABLE 8

| Rubber | Bound styrene content (wt. %) | 1,2-linkage unit content (mole %) | Mooney viscosity ($ML_{1+4}$, 100° C.) | Amount of the (thio)benzophenone (*) (moles per mole of the molecular chain) |
|---|---|---|---|---|
| BR(11) | | 44 | 72 | 0 |
| BR(12) | | 44 | 72 | 0.6 |
| BR(12') | | 44 | 72 | 0.6(**) |
| BR(13) | | 66 | 46 | 0 |
| BR(14) | | 66 | 46 | 0.8 |
| BR(14') | | 66 | 46 | 0.8(**) |
| BR(15) | | 84 | 56 | 0 |
| BR(16) | | 84 | 56 | 0.8 |
| BR(16') | | 84 | 56 | 0.8(**) |
| BR(17) | | 66 | 50 | 1.3(***) |
| SBR(5) | 37 | 19 | 43 | 0 |
| E-SBR | 45 | 20 | 65 | 0 |

(*): 4,4'-bis(diethylamino)benzophenone
(**): the thiobenzophenone corresponding to *
(***): Randomly bonded to the molecular chain. Otherwise, bonded to the chain ends.

TABLE 9

| | | Run No. | | | | | | | | |
|---|---|---|---|---|---|---|---|---|---|---|
| | | Comparison | | | Invention | | | | | |
| | | 1 | 2 | 3 | 4 | 5 | 6 | 7 | 8 | 9 |
| Rubber components | SBR 1502 | 100 | | | | | | | | |
| | BR(11) | | 60 | 40 | | | | | | |
| | BR(12) | | | | 60 | 60 | 40 | 40 | | |
| | BR(12') | | | | | | | | 60 | 60 |
| | E-SBR | | 20 | 30 | 20 | 20 | 30 | 30 | 20 | 20 |
| | Natural rubber RSS No. 3 | | 20 | 30 | 20 | | 30 | 20 | 20 | 10 |
| | cis BR | | | | | 20 | | 10 | | 10 |
| Sulfur | | 1.8 | 1.36 | 1.54 | 1.36 | 1.36 | 1.54 | 1.54 | 1.36 | 1.36 |
| Vulcanization accelerator | | 1.2 | 1.6 | 1.4 | 1.6 | 1.6 | 1.4 | 1.4 | 1.6 | 1.6 |
| Rebound (%) | | 55 | 62 | 62 | 69 | 67 | 65 | 64 | 69 | 68 |
| Wet skid resistance index | | 100 | 102 | 104 | 102 | 100 | 104 | 102 | 102 | 100 |
| Pico abrasion index | | 100 | 97 | 85 | 96 | 135 | 87 | 100 | 97 | 112 |
| Tensile strength (kg/cm²) | | 278 | 220 | 240 | 223 | 215 | 245 | 233 | 225 | 220 |
| Elongation (%) | | 490 | 490 | 490 | 470 | 460 | 470 | 460 | 460 | 450 |
| 300% Tensile strength (kg/cm²) | | 140 | 110 | 116 | 115 | 100 | 122 | 120 | 113 | 108 |

| | | Run No. | | | | | | | | | | | | |
|---|---|---|---|---|---|---|---|---|---|---|---|---|---|---|
| | | Comparison | | | Invention | | | | | | | | | |
| | | 10 | 11 | 12 | 13 | 14 | 15 | 16 | 17 | 18 | 19 | 20 | 21 | 22 |
| Rubber components | BR(13) | 50 | | | | | | | | | | | | |
| | BR(14) | | | | 50 | 50 | | | | | | | | |
| | BR(14') | | | | | | | | | | 50 | 50 | | |
| | BR(15) | | 40 | 40 | | | | | | | | | | |
| | BR(16) | | | | | | 40 | 40 | | | | | | |
| | BR(16') | | | | | | | | 40 | 40 | | | | |
| | BR(17) | | | | | | | | | | | | 60 | 60 |
| | SBR(11) | | | 40 | | | | | 40 | 40 | | | | |
| | SNR(5) | 30 | | | 30 | 30 | | | | | 30 | 20 | | |
| | E-SBR | | 20 | | | | 20 | 10 | | | | | 20 | 20 |
| | Natural rubber RSS No. 3 | 20 | 40 | 20 | 20 | | 40 | 30 | 20 | | 20 | 20 | 20 | 10 |
| | cis BR | | | | | 20 | | 20 | | 20 | | 10 | | 10 |
| Sulfur | | 1.44 | 1.56 | 1.52 | 1.44 | 1.44 | 1.56 | 1.56 | 1.52 | 1.52 | 1.44 | 1.44 | 1.36 | 1.36 |
| Vulcanization accelerator | | 152 | 1.36 | 1.44 | 1.52 | 1.52 | 1.36 | 1.36 | 1.44 | 1.44 | 1.52 | 1.52 | 1.6 | 1.6 |
| Rebound (%) | | 61 | 57 | 59 | 65 | 64 | 62 | 61 | 63 | 61 | 65 | 64 | 69 | 67 |
| Wet skid resistance index | | 103 | 114 | 104 | 103 | 100 | 114 | 105 | 104 | 101 | 103 | 100 | 102 | 100 |
| Pico abrasion index | | 88 | 70 | 83 | 85 | 126 | 69 | 108 | 80 | 115 | 85 | 100 | 95 | 103 |
| Tensile strength (kg/cm²) | | 225 | 238 | 230 | 222 | 210 | 250 | 230 | 240 | 223 | 220 | 200 | 215 | 205 |
| Elongation (%) | | 450 | 460 | 460 | 420 | 400 | 450 | 440 | 440 | 430 | 420 | 400 | 460 | 440 |
| 300% Tensile strength (kg/cm²) | | 124 | 130 | 128 | 129 | 125 | 139 | 122 | 135 | 120 | 127 | 113 | 120 | 110 |

EXAMPLE 5

Each of BR (1) and BR (5) rubbers used in Example 1, SBR (2) and SBR (4) used in Example 2 and BR, NR and cis BR indicated in Table 10 was compounded in the proportions shown in Table 11. The composition was vulcanized and tested in the same way as in Example 1. The results are shown in Table 11.

TABLE 10

| Rubber | 1,2-linkage unit content (mole %) | Mooney viscosity (ML$_{1+4}$, 100° C.) | Amount of the (thio)benzophenone bonded (moles per mole of the molecular chain) |
|---|---|---|---|
| BR(18) | 84 | 56 | 0 |
| BR(19) | 84 | 56 | 0.8(*) |
| BR(19') | 84 | 56 | 0.8(**) |

(*): 4,4'-bis(dimethylamino)benzophenone bonded to the chain end.
(**): the thiobenzophenone corresponding to (*); bonded to the chain end.

TABLE 11

| | | Run No. | | | | | | | | |
|---|---|---|---|---|---|---|---|---|---|---|
| | | Comparison | | | Invention | | | | | |
| | | 1 | 2 | 3 | 4 | 5 | 6 | 7 | 8 | 9 |
| Rubber components | SBR 1502 | 100 | | | | | | | | |
| | BR(1) | | 40 | 40 | | | | | | |
| | BR(2) | | | | 40 | 40 | 40 | 40 | | |
| | BR(2') | | | | | | | | 40 | 40 |
| | SBR(2) | | 30 | | 30 | 30 | | | 30 | 30 |
| | SBR(4) | | | 40 | | | 40 | 30 | | |
| | NR RSS #3 | | 30 | 20 | 30 | 20 | 20 | 20 | 30 | 20 |
| | cis BR | | | | | 10 | | 10 | | 10 |
| Sulfur | | 1.8 | 1.54 | 1.44 | 1.54 | 1.54 | 1.44 | 1.44 | 1.54 | 1.54 |
| Vulcanization accelerator | | 1.2 | 1.4 | 1.52 | 1.4 | 1.4 | 1.52 | 1.52 | 1.4 | 1.4 |
| Rebound (%) | | 55 | 63 | 60 | 67 | 65 | 63 | 63 | 67 | 66 |
| Wet skid resistance index | | 100 | 100 | 106 | 100 | 97 | 106 | 100 | 100 | 97 |
| Pico abrasion index | | 100 | 90 | 82 | 92 | 107 | 85 | 103 | 91 | 103 |
| Tensile strength (kg/cm$^2$) | | 278 | 215 | 220 | 223 | 210 | 230 | 220 | 220 | 211 |
| Elongation (%) | | 490 | 480 | 480 | 470 | 440 | 470 | 460 | 470 | 460 |
| 300% Tensile strength (kg/cm$^2$) | | 140 | 116 | 116 | 120 | 111 | 121 | 118 | 118 | 109 |

| | | Run No. | | | | | | | | | | | | | | |
|---|---|---|---|---|---|---|---|---|---|---|---|---|---|---|---|---|
| | | Comparison | | | Invention | | | | | | | | | | | |
| | | 10 | 11 | 12 | 13 | 14 | 15 | 16 | 17 | 18 | 19 | 20 | 21 | 22 | 23 | 24 |
| Rubber components | BR(3) | 50 | 50 | | | | | | | | | | | | | |
| | BR(4) | | | | 50 | 50 | 50 | 50 | | | | | | | | |
| | BR(4') | | | | | | | | | | 50 | 50 | | | | |
| | BR(18) | | | 40 | | | | | | | | | | | | |
| | BR(19) | | | | | | | | 40 | 40 | | | | | | |
| | BR(19') | | | | | | | | | | | | 40 | 40 | | |
| | BR(5) | | | | | | | | | | | | | | 40 | 40 |
| | SBR(2) | 30 | | 20 | 30 | 30 | | | 20 | 20 | 30 | 30 | 20 | 20 | 30 | 30 |
| | SBR(4) | | 20 | | | | 20 | 20 | | | | | | | | |
| | NR RSS #3 | 20 | 30 | 40 | 20 | 10 | 30 | 20 | 40 | 20 | 20 | 10 | 40 | 20 | 30 | 20 |
| | cis BR | | | | | 10 | | 10 | | 20 | | 10 | | 20 | | 10 |
| Sulfur | | 1.44 | 1.46 | 1.56 | 1.44 | 1.44 | 1.46 | 1.46 | 1.56 | 1.56 | 1.44 | 1.44 | 1.56 | 1.56 | 1.54 | 1.54 |
| Vulcanization accelerator | | 1.52 | 1.48 | 1.36 | 1.52 | 1.52 | 1.48 | 1.48 | 1.36 | 1.36 | 1.52 | 1.52 | 1.36 | 1.36 | 1.4 | 1.4 |
| Rebound (%) | | 60 | 59 | 59 | 65 | 63 | 64 | 63 | 64 | 63 | 65 | 64 | 64 | 63 | 67 | 66 |
| Wet skid resistance index | | 103 | 105 | 106 | 103 | 100 | 105 | 101 | 106 | 100 | 103 | 100 | 106 | 100 | 100 | 98 |
| Pico abrasion index | | 83 | 84 | 71 | 80 | 95 | 81 | 94 | 73 | 109 | 80 | 94 | 72 | 102 | 87 | 100 |
| Tensile strength (kg/cm$^2$) | | 210 | 225 | 220 | 219 | 213 | 230 | 216 | 235 | 210 | 220 | 205 | 230 | 206 | 215 | 200 |
| Elongation (%) | | 450 | 450 | 440 | 430 | 430 | 430 | 400 | 430 | 400 | 440 | 410 | 430 | 400 | 450 | 410 |
| 300% Tensile strength (kg/cm$^2$) | | 118 | 120 | 128 | 126 | 123 | 127 | 124 | 139 | 120 | 123 | 120 | 135 | 123 | 135 | 121 |

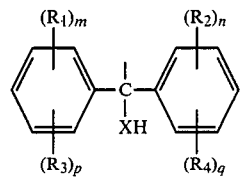

What we claim is:

1. A rubber composition for tire treads, said composition comprising
   (I) 10 to 70% by weight of an essentially amorphous polybutadiene rubber having a 1,2-linkage content of 40 to 90% and having bonded to a carbon atom of the rubber molecular chain at least 0.1 mole and up to about 5 moles, per mole of the rubber molecular chain, of an atomic grouping represented by the general formula wherein X represents O or S, $R_1$ and $R_2$ are identical or different and each represents an amino group or an alkyl-substituted amino group, $R_3$ and $R_4$ are identical or different and each represents a substituent other than an amino group or an alkyl substituted amino group, m, p and q represent 0 or an integer of at least 1, n represents an integer of at least 1, $m+p=0-5$ and $n+q=1-5$, and
   (II) 90 to 30% by weight of at least one rubber selected from the group consisting of styrene/butadiene copolymer rubber having a bound styrene content of from 3 to not more than 50% by weight and a 1,2-linkage content of butadiene units of 10 to 90%, natural rubber and synthetic polyisoprene rubber having a cis-1,4-linkage content of at least 90%.

2. The composition of claim 1 comprising 20 to 60% by weight of the polybutadiene rubber [I] and 80 to 40% by weight of the rubber [II].

3. The composition of claim 1 wherein X represents O.

4. The composition of claim 1 wherein X represents S.

5. The composition of claim 1 wherein $R_3$ and $R_4$ are identical or different and each represents a hydrocarbon group, an alkoxy group, or a halogen atom.

6. The composition of claim 1 wherein the atomic grouping is derived from a compound selected from the group consisting of 4-aminobenzophenone, 4-dimethylaminobenzophenone, 4-dimethylamino-4'-methylbenzophenone, 4,4'-diaminobenzophenone, 4,4'-bis(dimethylamino-benzophenone, 4,4'-bis(diethylamino)benzophenone, 4,4'-bis(ethylamino)benzophenone, 3,3'-dimethyl-4,4'-bis(diethylamino)benzophenone, 3,3'-dimethoxy-4,4'-bis(dimethylamino)benzophenone, 3,3',5,5'-tetraaminobenzophenone, 2,4,6-triaminobenzophenone, 3,3',5,5'-tetra(diethylamino)benzophenone, and the corresponding thiobenzophenones.

7. The composition of claim 1 in which at least 0.3 mole, per mole of the rubber molecular chain, of the atomic grouping represented by the formula is bonded to a carbon atom of the rubber molecular chain of the polybutadiene rubber.

8. The composition of claim 1 which further comprises from 5 to 50 parts by weight per 100 parts by weight of the polybutadiene rubber [I] and the rubber [II] of [III] a polybutadiene rubber having a cis-1,4-linkage content.

* * * * *